(12) United States Patent
Hashimoto

(10) Patent No.: US 9,116,358 B2
(45) Date of Patent: Aug. 25, 2015

(54) 2D/3D SWITCHABLE PARALLAX BARRIER DISPLAY

(75) Inventor: Kazuyuki Hashimoto, Miao-Li County (TW)

(73) Assignees: INNOCOM TECHNOLOGY(SHENZHEN) CO., LTD., Longhua Town, Shenzhen (CN); INNOLUX CORPORATION, Miao-Li County (TW)

( * ) Notice: Subject to any disclaimer, the term of this patent is extended or adjusted under 35 U.S.C. 154(b) by 465 days.

(21) Appl. No.: 13/474,402

(22) Filed: May 17, 2012

(65) Prior Publication Data

US 2013/0308067 A1    Nov. 21, 2013

(51) Int. Cl.
| | |
|---|---|
| *G02F 1/1335* | (2006.01) |
| *G02B 27/22* | (2006.01) |
| *G02F 1/1343* | (2006.01) |
| *H04N 13/04* | (2006.01) |

(52) U.S. Cl.
CPC ...... *G02B 27/2214* (2013.01); *G02F 1/134309* (2013.01); *H04N 13/0409* (2013.01); *H04N 13/0452* (2013.01); *G02F 2201/124* (2013.01)

(58) Field of Classification Search
CPC ............. H04N 13/0409; H04N 13/045; G02F 1/134363; G02F 1/134309; G02F 1/1343; G02F 2201/124; G02F 27/2214
See application file for complete search history.

(56) References Cited

U.S. PATENT DOCUMENTS

| 8,441,584 | B2 | 5/2013 | Ohyama et al. | |
|---|---|---|---|---|
| 2011/0043715 | A1* | 2/2011 | Ohyama et al. | 349/15 |
| 2012/0013606 | A1* | 1/2012 | Tsai et al. | 349/15 |
| 2012/0038854 | A1 | 2/2012 | Inoue | |
| 2012/0188196 | A1* | 7/2012 | Liu et al. | 345/174 |
| 2012/0188475 | A1* | 7/2012 | Inoue | 349/36 |
| 2013/0063431 | A1* | 3/2013 | Park | 345/419 |

FOREIGN PATENT DOCUMENTS

| CN | 102375265 A | 3/2012 |
|---|---|---|
| TW | 201137397 A | 11/2011 |

OTHER PUBLICATIONS

TW Office Action dated Dec. 15, 2014.

\* cited by examiner

*Primary Examiner* — Richard Kim
*Assistant Examiner* — Ryan Crockett
(74) *Attorney, Agent, or Firm* — McClure, Qualey & Rodack, LLP

(57) ABSTRACT

A 3D display is provided, at least comprising a display module, a backlight module disposed beneath the display module, and a barrier module disposed above the display module. The barrier module comprises a bottom substrate having a bottom electrode layer, an upper substrate having an upper electrode layer, and a liquid crystal layer disposed between the bottom substrate and the upper substrate. At least one of the bottom electrode layer and the upper electrode layer comprises at least two finger electrodes interlaced to each other, and voltages with opposite direction are applied on the two finger electrodes at the same time interval in a 3D driving mode.

7 Claims, 11 Drawing Sheets

2D/3D SWITCHABLE PARALLAX BARRIER DISPLAY

BACKGROUND

1. Technical Field

The disclosed embodiments relate in general to a 2D (two-dimensional)/3D (three-dimensional) switchable display, and more particularly to a 2D/3D switchable parallax barrier display with a low noise driving scheme.

2. Description of the Related Art

Autostereoscopic displays, also known as "Naked eye 3D display", are able to provide binocular depth perception without the hindrance of specialized headgear or filter/shutter glasses. The naked eye 3D display technology has been developed for many years to provide stereoscopic vision by fooling the human brain, so that a 2D medium can display a 3D image by providing a stereo parallax view for the user.

Naked eye 3D displays have been demonstrated using a range of optical elements in combination with an LCD including parallax barrier technology and lenticular optic technology to provide stereoscopic vision. Generally, the parallax barrier has optical apertures aligned with columns of LCD pixels, and the lenticular optics has cylindrical lenses aligned with columns of LCD pixels. A parallax barrier is an electro optic panel with fine and vertical strips that are placed at a regular spacing, in front or rear of a colored LCD. FIG. 1 is a conventional 2D/3D switchable display with parallax barrier in front of display module. The 2D/3D switchable display 1 includes a backlight system 11, a display module 13 on the backlight system 11, a parallax barrier 15 above the display module 13, the polarizers 16a and 16b respectively on two sides of the display module 13, and polarizer 16c on the parallax barrier 15. The parallax barrier 15 having fine opaque strips separates the light pathway of spatial images into images for left eye and right eye to perceive 3D images. Users can see the left eye image/right eye image while the opaque stripes would block the right eye/left eye in the three-dimensional display mode. A touch sensor could be further integrated into the 2D/3D switchable display 1 by coupling a sensing electrode (not shown) on the parallax barrier 15, to making a 2D/3D display with touch screen.

FIG. 2 illustrates a 3D-mode driving scheme of the parallax barrier of a conventional normally-white LCD The parallax barrier (15 of FIG. 1) is a LCD panel comprising a LC layer 156 sandwiched between the bottom substrate and the top substrate, respectively having a bottom electrode 152 and a top electrode 154 coupled to different voltage sources. Typically, one of the bottom electrode 152 and the top electrode 154 is applied with a common voltage (i.e. 0V) while the other is applied with alternating voltages such as −5V and +5V. However, alternating voltage of the bottom electrode 152 induces voltage fluctuations (dotted-circled) on the top electrode 154. The voltage fluctuations would be a noise for the touch screen, which influences a performance of capacitive touch screen combined or integrated with the 3D display. To eliminate the influences with suppressing the voltage fluctuation, reducing a wiring resistance Rw of the top electrode 154 to coupling to ground (0V), shown in FIG. 2, is one of the solutions. However, a conductivity of transparent material of LC driving (i.e. ITO) complicates this countermeasure because it has relatively higher conductivity than metals like copper, aluminum and so on.

SUMMARY

The disclosure is directed to a 2D/3D switchable parallax barrier display with low noise driving scheme. The display with a parallax barrier having particular electrode design and voltage alternation scheme is capable of suppressing the voltage fluctuation, thereby reducing the noise of the sensing electrode of touch screen integrated into the display.

According to one embodiment, a 3D display is provided, at least comprising a display module, a backlight module disposed beneath the display module, and a barrier module disposed above the display module. The barrier module comprises a bottom substrate having a bottom electrode layer, an upper substrate having an upper electrode layer, and a liquid crystal layer disposed between the bottom substrate and the upper substrate. At least one of the bottom electrode layer and the upper electrode layer comprises at least two finger electrodes interlaced to each other, and voltages with opposite direction are applied on the two finger electrodes at the same time interval in a 3D driving mode.

The disclosure will become apparent from the following detailed description of the preferred but non-limiting embodiments. The following description is made with reference to the accompanying drawings.

Figure 1:
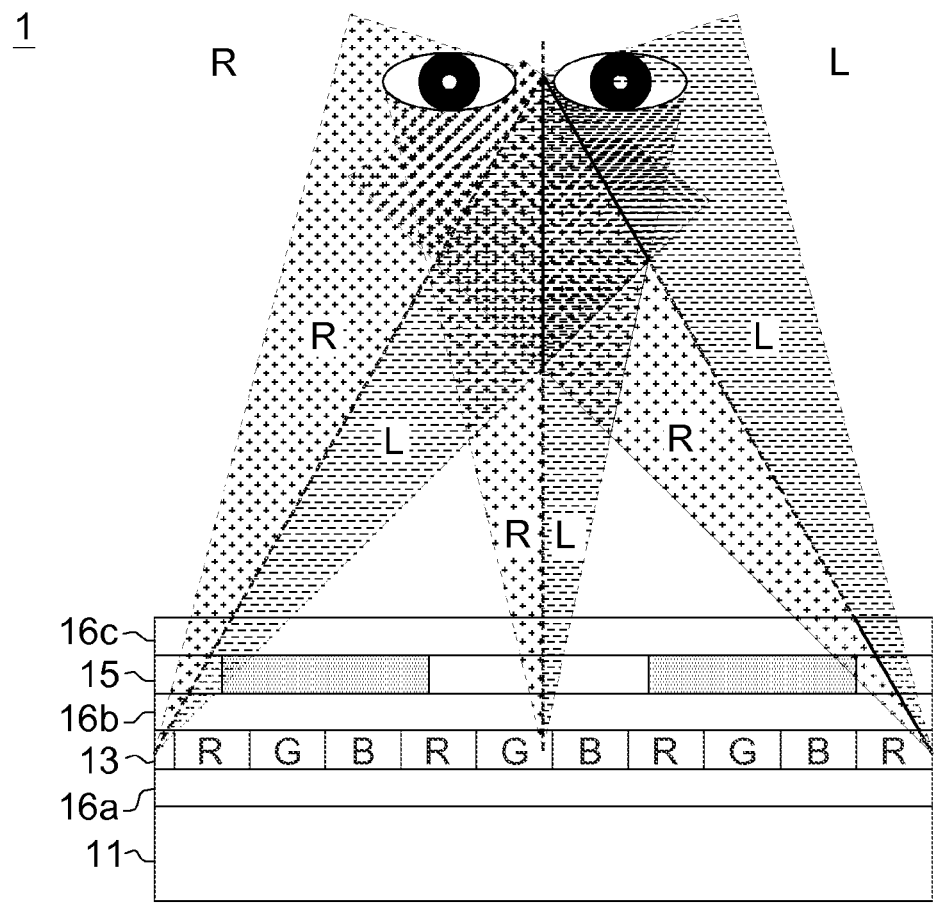
FIG. 1 is a conventional 2D/3D switchable display with parallax barrier in front of display module.
Figure 2:
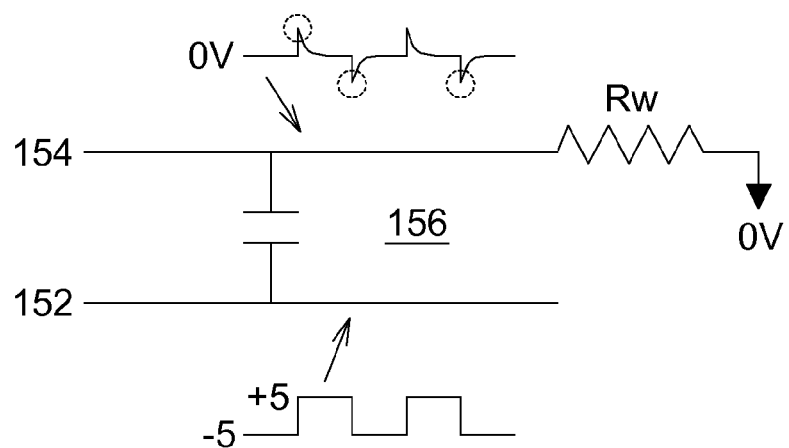
FIG. 2 illustrates a 3D-mode driving scheme of the parallax barrier of a conventional normally-white LCD.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiments of the present disclosure provide a 2D/3D switchable parallax barrier display with a low noise driving scheme. The display of the embodiment (such as liquid crystal display, LCD) utilizes the electrode design and voltage alternation scheme of the parallax barrier for suppressing the voltage fluctuation, thereby reducing the noise of the sensing electrode if capacitive touch screen is integrated into the display.

LCD embodiments are provided to demonstrate, but not intended to limit, the display structures of the present disclosure. The modifications and variations can be made without departing from the spirit of the disclosure to meet the requirements of the practical applications.

First Embodiment

Figure 3A:
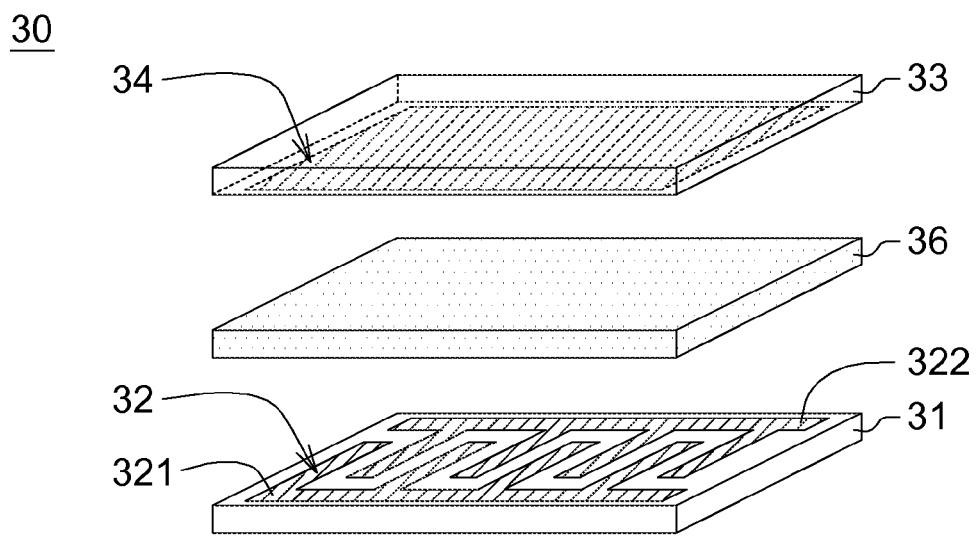
FIG. 3A shows a parallax barrier of a 2D/3D switchable display according to the first embodiment of the present disclosure.
Figure 3B:
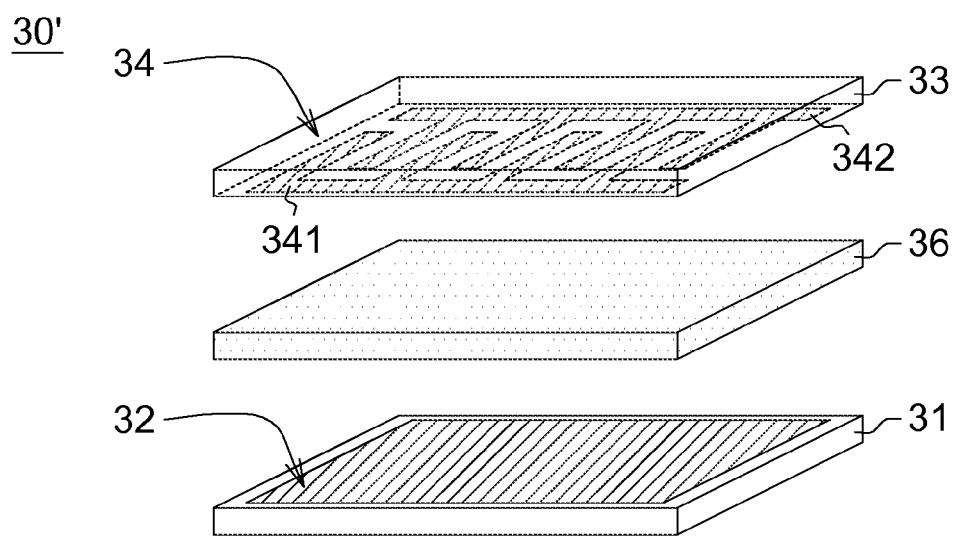
FIG. 3B shows another parallax barrier of a 2D/3D switchable display according to the first embodiment of the present disclosure.

FIG. 3A shows a parallax barrier of a 2D/3D switchable display according to the first embodiment of the present disclosure. FIG. 3B shows another parallax barrier of a 2D/3D switchable display according to the first embodiment of the present disclosure. The difference between the parallax barriers 30 and 30' of FIG. 3A and FIG. 3B is a switch of electrode arrangement.

Please refer to FIG. 3A. The parallax barrier 30 could be disposed on a display module (not shown in FIG. 3A) and is a LCD panel comprising a bottom substrate 31 having a bottom electrode layer 32, a top substrate 33 having a top electrode layer 34, and a LC layer 36 sandwiched between the bottom substrate 31 and the top substrate 33. The bottom electrode layer 32 and the top electrode layer 34 are coupled to different voltage sources.

In FIG. 3A, the upper electrode layer 34 is a flat plane, and the bottom electrode layer 32 at least comprises two finger electrodes interlaced to each other and separated with a space. As shown in FIG. 3A, the bottom electrode 32 comprises a first finger electrode 321 coupled to a first voltage source, and a second finger electrode 322 interlaced with the first finger electrode 321 and coupled to a second voltage source. Also, voltages with opposite direction could be applied on the first finger electrode 321 and the second finger electrode 322 at the same time interval when the display is in a 3D driving mode.

Figure 4A:
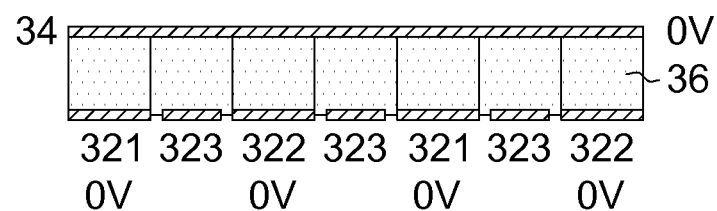
FIG. 4A is a cross-sectional view of the parallax barrier of FIG. 3A, which depicts one of the 2D-mode driving voltage applications.

FIG. 4A is a cross-sectional view of the parallax barrier of FIG. 3A, which depicts one of the 2D-mode driving voltage applications. In a 2D driving mode, the bottom electrode layer 32 and the top electrode layer 34 could be applied with B voltage (i,e, the parallax barrier being turned off). Therefore, the parallax barrier functions as a transparent plate and the users see the 2D images. The B voltage may be ground voltage or common voltage, and the value of B can be positive, negative or 0 (such as 0V).

Figure 4B:
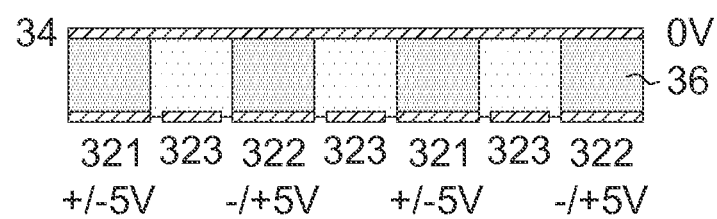
FIG. 4B is a cross-sectional view of the parallax barrier of FIG. 3A, which depicts one of the 3D-mode driving voltage applications.

FIG. 4B is a cross-sectional view of the parallax barrier of FIG. 3A, which depicts one of the 3D-mode driving voltage applications. In a 3D driving mode, the top electrode layer 34 could be applied with B voltage, the first finger electrode 321 could be applied with +A+B voltage, and the second finger electrode 322 could be applied with −A+B voltage at the same time interval. In one example for normally white LCD, the top electrode layer 34 is applied with 0V, the first finger electrode 321 is applied with +5V, and the second finger electrode 322 is simultaneously applied with −5V at the first time interval; the first finger electrode 321 is applied with −5V, and the second finger electrode 322 is simultaneously applied with +5V at the second time interval, and voltage alternation regularly goes on. It is noted that the voltage values are merely for demonstration, not for limitation, and could be selected according to the actual needs of applications.

Figure 5:
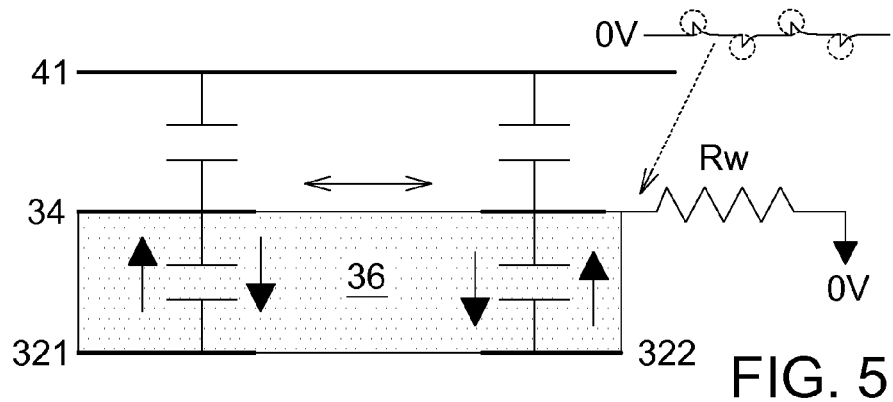
FIG. 5 illustrates a 3D-mode driving scheme of the parallax barrier and a sensor electrode of the display of FIG. 3A according to the first embodiment of the present disclosure.
Figure 6:
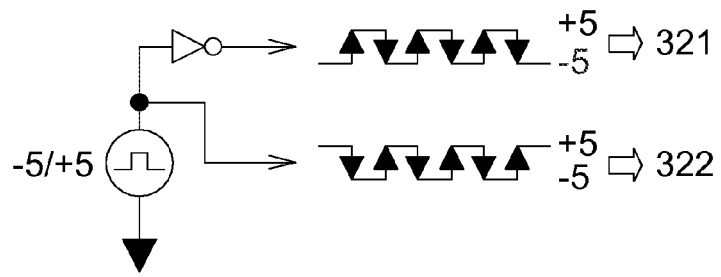
FIG. 6 is a 3D-mode driving circuit diagram of the bottom electrode layer of the display of FIG. 4B.

FIG. 5 illustrates a 3D-mode driving scheme of the parallax barrier and a sensor electrode of the display of FIG. 3A according to the first embodiment of the present disclosure. FIG. 6 is a 3D-mode driving circuit diagram of the bottom electrode layer of the display of FIG. 4B. Please refer to FIG. 5 and FIG. 6. In an embodiment, simultaneous voltage alternations of the first finger electrode 321 and the second finger electrode 322 have opposite directions each others and equal absolute value of step voltages (FIG. 6), thus induced charges on the top electrode layer 34 could be cancelled, and then voltage fluctuation (dotted-circled as shown in FIG. 5) on the top electrode layer 34 would be suppressed even if wiring resistance Rw of the top electrode layer 3 to GND is not low enough. The suppression of voltage fluctuation contributes easiness of capacitive touch screen integration on 3D display as "Low electromagnetic coupling/emission noise parallax barrier LCD". Also, voltage alternation between the first finger electrode 321 and the second finger electrode 322 could be implemented by coupling to the same AC voltage source with a phase voltage regulator (SVR), as shown in FIG. 6. The phase voltage regulator is installed for regulating the output voltage to one of the first and second finger electrodes 321/322, e.g., changing a positive output voltage to a negative voltage. However, the disclosure is not limited to the use of one voltage source. Voltage alternation is also implementable by coupling the first finger electrode 321 and the second finger electrode 322 to different voltage sources. The implementation is optionally selected, depending on designs of applications.

Furthermore, the bottom electrode layer 32 of the parallax barrier according to the embodiment would optionally comprise a bottom middle electrode 323 disposed between the first finger electrode 321 and the second finger electrode 322, as shown in FIG. 4A and FIG. 4B. The first finger electrode 321, the bottom middle electrode 323 and the second finger electrode 322 are coupled to different voltage sources. In a 2D driving mode, the bottom middle electrode 323 is applied with 0V (i,e, the parallax barrier being turned off). In a 3D driving mode, the bottom middle electrode 323 is applied with 0V. In the 3D display applications, existence of the bottom middle electrode 323 of the parallax barrier improves the image quality, particularly the image corresponding to the boundaries between the electrodes, such as boundaries between the first finger electrode 321 and the bottom middle electrode 323, and boundaries between the second finger electrode 322 and the bottom middle electrode 323, thereby presenting clean and sharp image.

In addition to the electrode design of FIG. 3A, the finger electrodes could be alternatively formed on the top substrate 33. As shown in the parallax barrier 30' of FIG. 3B, the bottom electrode layer 32 is a flat plane, and the upper electrode layer 34 at least comprises two finger electrodes 341 and 342 interlaced to each other and separated with a space. Similarly, voltages with opposite direction could be applied on the electrodes 341 and 342 at the same time interval when the display is in a 3D driving mode. Thus, the induced charge on bottom electrode 32 is cancelled and then voltage fluctuation on bottom electrode 32 and induced charge on touch screen electrode integrated on 3D display is cancelled. The influence to touch screen by the alternation is reduced consequently. Other details, such as 2D-mode and 3D-mode driving voltage applications, are similar to the illustration presented above, and not described redundantly.

Second Embodiment

Figure 7:
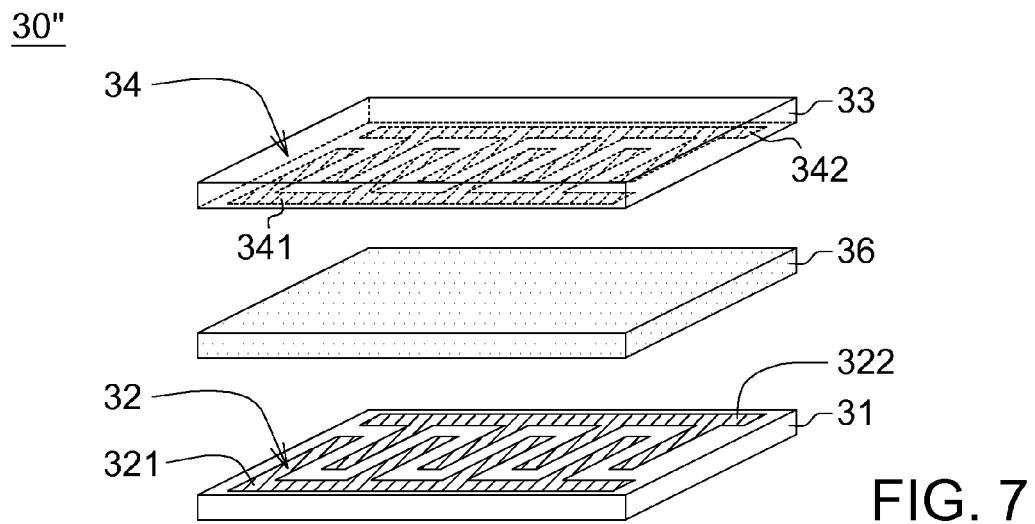
FIG. 7 shows a parallax barrier of a 2D/3D switchable display according to the second embodiment of the present disclosure.

FIG. 7 shows a parallax barrier of a 2D/3D switchable display according to the second embodiment of the present disclosure. Components of the parallax barrier 30" of FIG. 7 common to that of the parallax barrier 30 of FIG. 3A retain the same reference numbers. Structural difference between the parallax barriers of the second and the first embodiment are the configurations of the top electrode layer.

Similarly, the parallax barrier 30" includes a bottom substrate 31 having a bottom electrode layer 32, a top substrate 33 having a top electrode layer 34, and a LC layer 36 sandwiched between the bottom substrate 31 and the top substrate 33. One or more of the voltage sources are, not limited, coupled to the bottom electrode layer 32 and the top electrode layer 34. Practically, the electrodes driven by the same or similar signal in operation, e.g., applied with the same or similar voltage could be coupled to the same voltage source.

In the second embodiment, each of the upper electrode layer 34 and the bottom electrode layer 32 comprises two finger electrodes interlaced to each other and separated with a space. As shown in FIG. 7, the bottom electrode 32 comprises a first finger electrode 321 and a second finger electrode 322 interlaced with the first finger electrode 321. The top electrode 34 comprises a third finger electrode 341 and a fourth finger electrode 342 interlaced with the third finger electrode 341.

Figure 8:
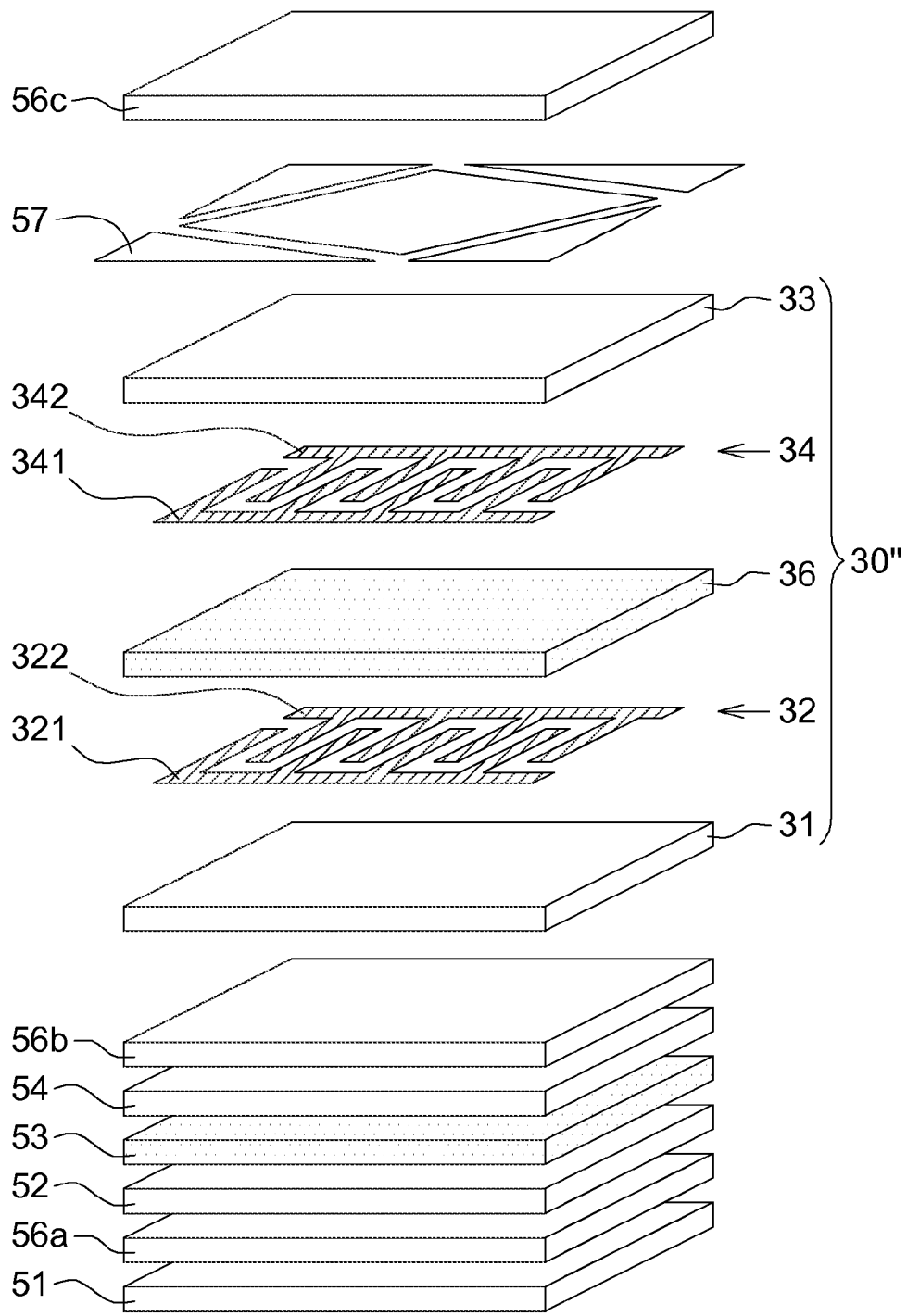
FIG. 8 is a 2D/3D switchable display with parallax barrier in front of display module according to the second embodiment of the disclosure.

FIG. 8 is a 2D/3D switchable display with parallax barrier in front of display module according to the second embodiment of the disclosure. The 2D/3D switchable display 5 includes a backlight system 51, a display module (including LC layer 53 sandwiched between the bottom substrate 52 and the top substrate 54) disposed on the backlight system 51, the parallax barrier 30" disposed above the display module, a sensing electrode 57 disposed on the parallax barrier 30", the polarizers 56a and 56b respectively on outsides of the bottom substrate 52 and the top substrate 54, and polarizer 56c on the sensing electrode 57. The sensing electrode 57 integrated into the display could be an electrode of capacitive touch screen, to making a 2D/3D display with touch screen.

In the parallax barrier 30" of the second embodiment, the upper electrode layer 34 is substantially aligned with the bottom electrode layer 32. As shown in FIG. 8, the first finger electrode 321 of the bottom electrode layer 32 is substantially aligned with the third finger electrode 341 of the upper electrode layer 34, while the second finger electrode 322 of the bottom electrode layer 32 is substantially aligned with the fourth finger electrode 342 of the upper electrode layer 34.

Figure 9A:
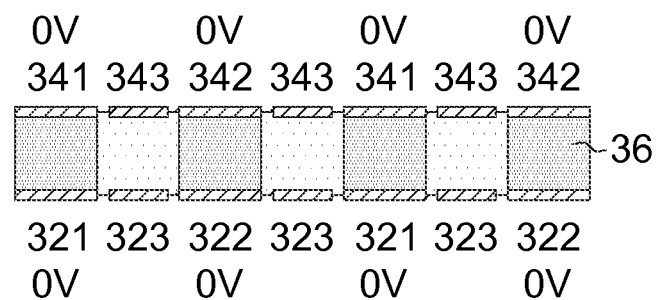
FIG. 9A is a cross-sectional view of the parallax barrier of FIG. 7, which depicts one of the 2D-mode driving voltage applications.

FIG. 9A is a cross-sectional view of the parallax barrier of FIG. 7, which depicts one of the 2D-mode driving voltage applications. In a 2D driving mode, the bottom electrode layer 32 (ex. the first finger electrode 321 and the second finger electrode 322) and the top electrode layer 34 (ex. the third finger electrode 341 and the fourth finger electrode 342) could be applied with B voltage (i,e, the parallax barrier being turned off). Therefore, the parallax barrier functions as a transparent plate and the users see the 2D images. The B voltage may be ground voltage or common voltage, and the value of B can be positive, negative or 0 (such as 0V).

In a 3D driving mode, the first finger electrode 321 and the second finger electrode 322 could be applied by the voltages with opposite directions at the same time interval; the first finger electrode 321 and the third finger electrode 341 could be applied by the voltages with opposite directions at the same time interval; the third finger electrode 341 and the fourth finger electrode 342 could be applied by the voltages with opposite directions at the same time interval.

Figure 9B:
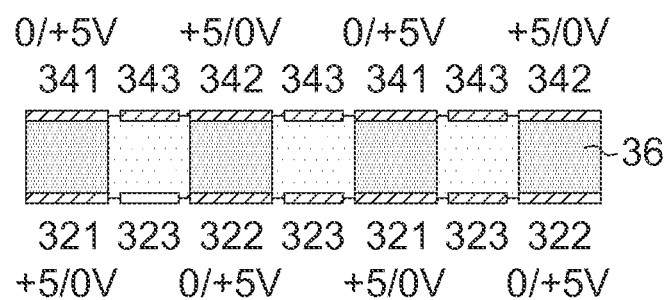
FIG. 9B is a cross-sectional view of the parallax barrier of FIG. 7, which depicts one of the 3D-mode driving voltage applications.

FIG. 9B is a cross-sectional view of the parallax barrier of FIG. 7, which depicts one of the 3D-mode driving voltage applications. In a 3D driving mode, the first finger electrode 321 and the fourth finger electrode 342 could be applied with +A+B voltage, and the second finger electrode 322 and the third finger electrode 341 could be simultaneously applied with B voltage at a first time interval; while the first finger electrode 321 and the fourth finger electrode 342 could be applied with B voltage, and the second finger electrode 322 and the third finger electrode 341 could be simultaneously applied with +A+B voltage, at a second time interval. In one example for normally white LCD, the first finger electrode 321 and the fourth finger electrode 342 could be applied with +5V, while the second finger electrode 322 and the third finger electrode 341 could be simultaneously applied with 0V at the first time interval; and the first finger electrode 321 and the fourth finger electrode 342 could be applied with 0 voltage, and the second finger electrode 322 and the third finger electrode 341 could be simultaneously applied with +5V at the second time interval, and voltage alternation regularly goes on. Optionally, the first finger electrode 321 and the fourth finger electrode 342 could be coupled to the same voltage source, and the second finger electrode 322 and the third finger electrode 341 could be coupled to another voltage source. Also, voltage alternation between those finger electrodes could be implemented by coupling to the same AC voltage source with a phase voltage regulator (SVR). It is noted that the voltage values are merely for demonstration, not for limitation, and could be selected according to the actual needs of applications.

Figure 10:
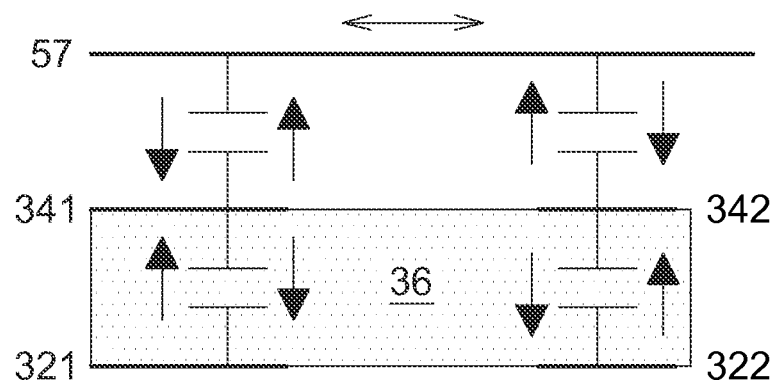
FIG. 10 illustrates a 3D-mode driving scheme of the parallax barrier and a sensor electrode of the display according to the second embodiment of the present disclosure.
Figure 11:
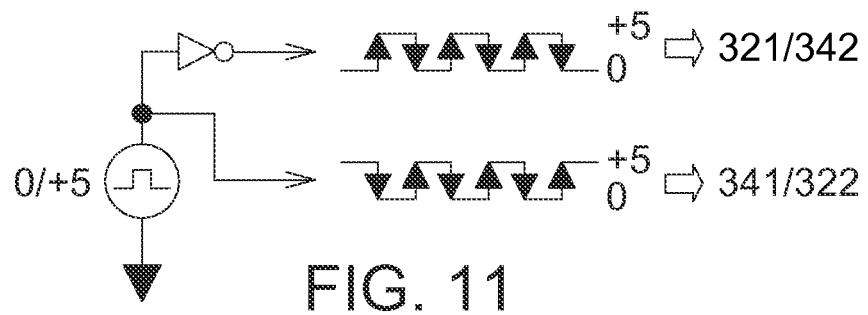
FIG. 11 is a 3D-mode driving circuit diagram of the bottom electrode layer of the display of FIG. 9B.

FIG. 10 illustrates a 3D-mode driving scheme of the parallax barrier and a sensor electrode of the display according to the second embodiment of the present disclosure. FIG. 11 is a 3D-mode driving circuit diagram of the bottom electrode layer of the display of FIG. 9B. Please refer to FIG. 8, FIG. 10 and FIG. 11. In an embodiment, simultaneous voltage alternations of the third finger electrode 341 and the fourth finger electrode 342 have opposite directions each others and equal absolute value of step voltages (FIG. 11), thus induced charges on the sensing electrode 57 (i.e. touch screen electrode) integrated into 3D display could be cancelled and then influence to the touch screen by the alternation could be reduced. Also, voltage alternation between a set of the first finger electrode 321 and the fourth finger electrode 342 and another set of the second finger electrode 322 and the third finger electrode 341 could be implemented by coupling to the same AC voltage source with a phase voltage regulator (SVR), as shown in FIG. 11. The phase voltage regulator is installed for regulating the output voltage to one set of the finger electrodes, e.g., changing a positive output voltage to a negative voltage. The reduction of influence contributes easiness of capacitive touch screen integration on 3D display as "Low electromagnetic coupling/emission noise parallax barrier LCD".

Similarly, the bottom electrode layer 32 of the parallax barrier according to the second embodiment would optionally comprise a bottom middle electrode 323 disposed between the first finger electrode 321 and the second finger electrode 322, and a top middle electrode 343 disposed between the third finger electrode 341 and the fourth finger electrode 342, as shown in FIG. 9A and FIG. 9B. Also, the top middle electrode 343 is substantially aligned with the bottom middle electrode 323. Similarly, the electrodes of those finger electrodes and middle electrodes applied with the same or similar voltage could be coupled to the same voltage source with a regulator/modulator (such as a phase voltage regulator).

In a 2D driving mode, the bottom middle electrode 323 and the top middle electrode 343 are applied with 0V (i,e, the parallax barrier being turned off). In a 3D driving mode, the bottom middle electrode 323 and the top middle electrode 343 are applied with 0V. In the 3D display applications, existence of the bottom middle electrode 323 and the top middle electrode 343 of the parallax barrier improves the image quality, particularly the image corresponding to the boundaries between the electrodes, such as boundaries between the first finger electrode 321 and the bottom middle electrode 323, boundaries between the second finger electrode 322 and the bottom middle electrode 323, boundaries between the third finger electrode 341 and the top middle electrode 343, and boundaries between the top middle electrode 343 and the fourth finger electrode 342, thereby presenting clean and sharp image.

Third Embodiment

Figure 12:
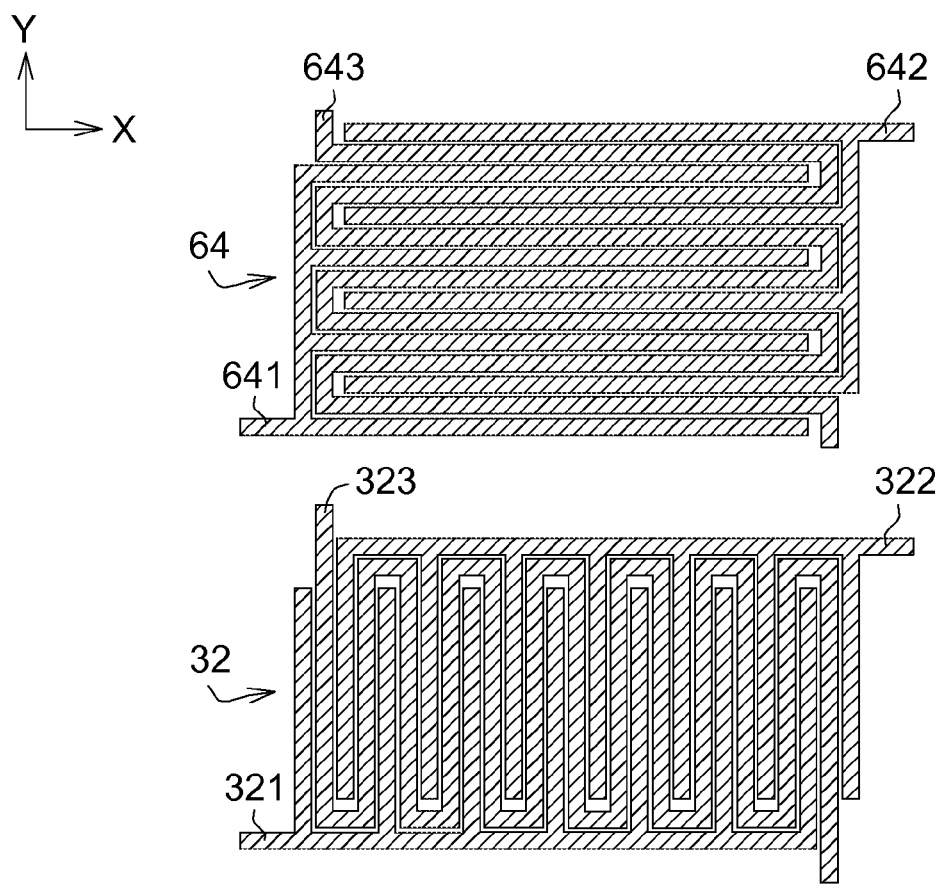
FIG. 12 illustrates a top electrode layer and a bottom electrode layer of a parallax barrier of a 2D/3D switchable display according to the third embodiment of the present disclosure.

FIG. 12 illustrates a top electrode layer and a bottom electrode layer of a parallax barrier of a 2D/3D switchable display according to the third embodiment of the present disclosure. In FIG. 12, the bottom substrate, the top substrate, and a LC layer sandwiched between the bottom substrate and the top substrate of the parallax barrier are not shown in the drawing to avoid obscuring the third embodiment. Also, components of FIG. 12 common to that of the parallax barrier 30" of FIG. 7 retain the same reference numbers. Structural difference between the parallax barriers of the second and the third embodiment are the configurations of the top electrode layer.

Similarly, a bottom electrode 32 comprises a first finger electrode 321, a second finger electrode 322 interlaced with the first finger electrode 321 and separated with a space, and a bottom middle electrode 323 optionally disposed between the first finger electrode 321 and the second finger electrode 322. A top electrode 64 comprises a third finger electrode 641, a fourth finger electrode 642 interlaced with the third finger electrode 641 and separated with a space, and a top middle electrode 643 optionally disposed between the third finger electrode 641 and the fourth finger electrode 642, as shown in FIG. 12. Similarly, the electrodes of those finger electrodes (i.e. the first, second, third and fourth finger electrodes 321, 322, 641 and 642) and the middle electrodes (i.e. the bottom and top middle electrodes 323 and 643) applied with the same or similar voltage could be coupled to the same voltage source with a modulator such as a phase voltage regulator.

The first finger electrode 321 and the second finger electrode 322 form a plurality of bottom slits with a bottom elongating direction substantially parallel to Y-axis, while the third finger electrode 641 and the fourth finger electrode 642 form a plurality of top slits with a top elongating direction parallel to X-axis, as shown in FIG. 12. Accordingly, the bottom elongating direction (parallel to Y-axis) of bottom slits is substantially perpendicular to the top elongating direction (parallel to X-axis). Also, the bottom elongating direction (parallel to Y-axis) of bottom slits is substantially parallel to a wide side of a display area of the display module, while the top elongating direction (parallel to X-axis) of top slits is substantially parallel to the a long side of the display area.

Figure 13:
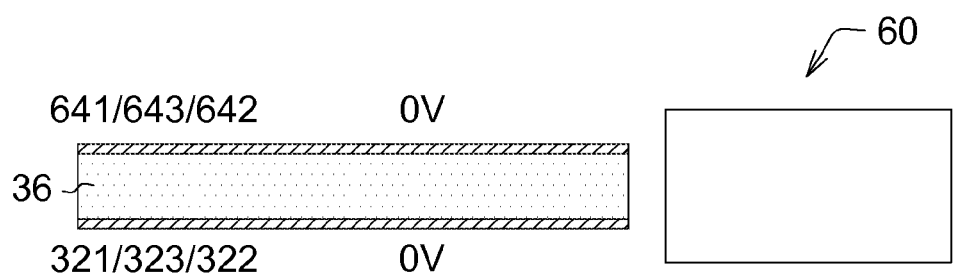
FIG. 13 is a cross-sectional view of the parallax barrier of FIG. 12 according to the third embodiment, which depicts one of the 2D-mode driving voltage applications.

FIG. 13 is a cross-sectional view of the parallax barrier of FIG. 12 according to the third embodiment, which depicts one of the 2D-mode driving voltage applications. In a 2D driving mode, the bottom electrode layer 32 (ex. the first finger electrode 321, the bottom middle electrode 323 and the second finger electrode 322) and the top electrode layer 64 (ex. the third finger electrode 641, the top middle electrode 643 and the fourth finger electrode 642) could be applied with B Voltage (i,e, the parallax barrier being turned off). Therefore, the parallax barrier functions as a transparent plate and the barrier LCD image 60 presents no black and white strips, thereby allowing the users viewing the 2D images. The B voltage may be ground voltage or common voltage, and the value of B can be positive, negative or 0 (such as 0V).

Figure 14A:
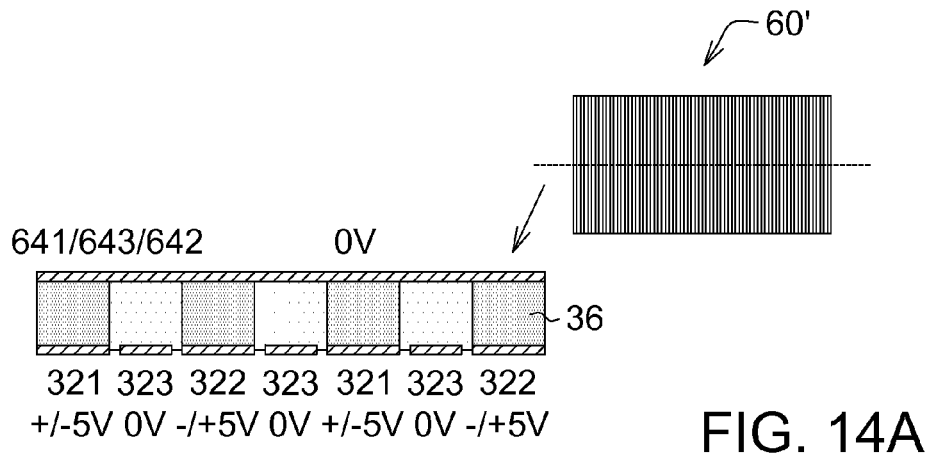
FIG. 14A is a cross-sectional view of the parallax barrier of FIG. 12 according to the third embodiment, which depicts one of the 3D-landscape mode driving voltage applications.
Figure 14B:
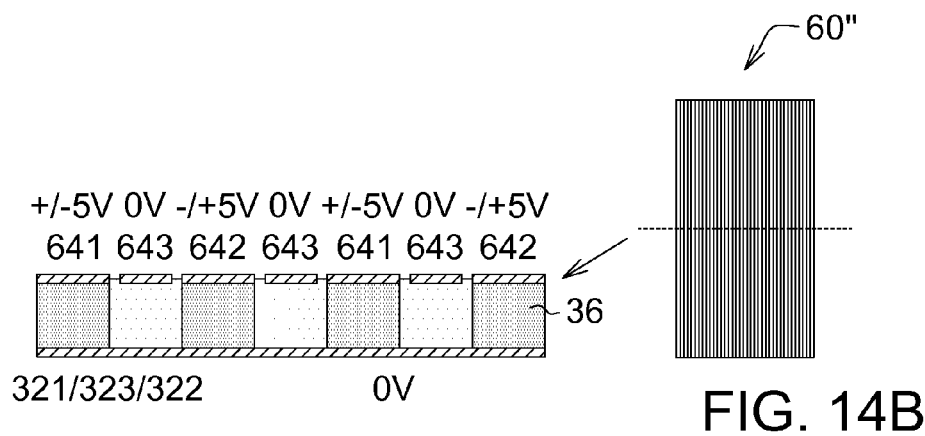
FIG. 14B is a cross-sectional view of the parallax barrier of FIG. 12 according to the third embodiment, which depicts one of the 3D-portrait mode driving voltage applications.

In FIG. 12, one of the bottom electrode layer 32 and the top electrode layer 64 could be operated, depending on the page orientation of the display for viewing. The two most common types of orientation are portrait and landscape. Originally, portrait of a person's face and upper body is more fitting for a canvas or photo where the height of the display area is greater than the width, and is more common for the pages of books. Landscape originally described artistic outdoor scenes where a wide view area is needed. FIG. 14A is a cross-sectional view of the parallax barrier of FIG. 12 according to the third embodiment, which depicts one of the 3D-landscape mode driving voltage applications. FIG. 14B is a cross-sectional view of the parallax barrier of FIG. 12 according to the third embodiment, which depicts one of the 3D-portrait mode driving voltage applications.

As shown in FIG. 14A, if user would like to proceed the 3D-landscape mode, the top electrode layer 64, including the third finger electrode 641, the top middle electrode 643 and the fourth finger electrode 642, could be applied with B Voltage (such as 0V) to reveal the bottom slits. Also, the first finger electrode 321 and the second finger electrode 322 could be simultaneously applied with +A+B voltage (such as +5V) and −A+B voltage (such as −5V), while the bottom middle electrode 323 (optionally disposed) could be applied with B Voltage (such as 0V). The alternating voltages are applied on the first finger electrode 321 and the second finger electrode 322 at the next time interval. Voltage alternation regularly goes on. Accordingly, the barrier LCD image 60' presents black and white strips substantially parallel to the wide side of a display area.

As shown in FIG. 14B, if user would like to proceed the 3D-portrait mode, the bottom electrode layer 32, including the first finger electrode 321, the bottom middle electrode 323 and the second finger electrode 322, could be applied with B Voltage (such as 0V) to reveal the top slits. Also, the third finger electrode 641 and the fourth finger electrode 642 are simultaneously applied with +A+B (such as +5V) voltage and −A+B voltage (such as −5V), while the top middle electrode 643 (optionally disposed) could be applied with B Voltage (such as 0V). The alternating voltages are applied on the third finger electrode 641 and the fourth finger electrode 642 at the next time interval. Voltage alternation regularly goes on. Accordingly, the barrier LCD image 60" presents black and white strips substantially parallel to the long side of a display area.

It is, of course, noted that the voltage values are merely for demonstration, not for limitation, and could be selected according to the actual needs of applications.

Figure 15:
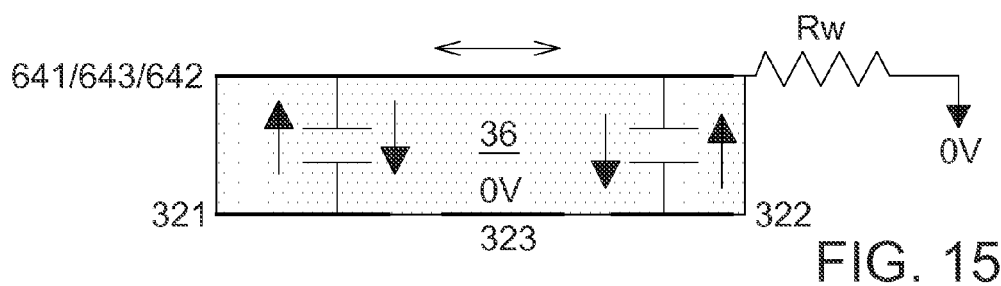
FIG. 15 illustrates a 3D-landscape mode driving scheme of the parallax barrier of FIG. 12 according to the third embodiment of the present disclosure.
Figure 16:
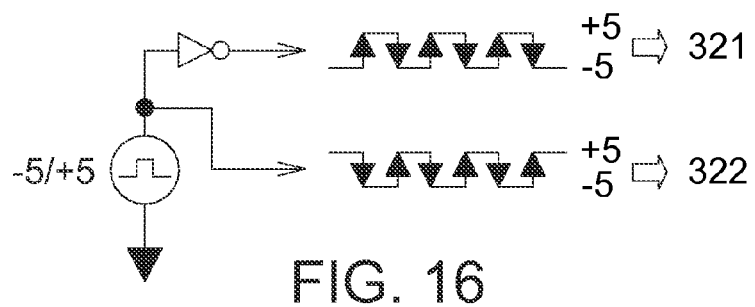
FIG. 16 is a 3D-landscape mode driving circuit diagram of the bottom electrode layer of the display of FIG. 14A.

FIG. 15 illustrates a 3D-landscape mode driving scheme of the parallax barrier of FIG. 12 according to the third embodiment of the present disclosure. FIG. 16 is a 3D-landscape mode driving circuit diagram of the bottom electrode layer of the display of FIG. 14A. Please refer to FIG. 15 and FIG. 16. In an embodiment, simultaneous voltage alternations of the first finger electrode 321 and the second finger electrode 322 have opposite directions each others and equal absolute value of step voltages (FIG. 16), thus induced charges on the top electrode layer 64 (641/643/642) could be cancelled, and then influence to the touch screen by the alternation could be reduced. The voltage fluctuation on the top electrode layer 64 would be suppressed even if wiring resistance Rw of the top electrode layer 64 to GND is not low enough. Also, voltage alternation between the first finger electrode 321 and the second finger electrode 322 could be optionally implemented by coupling to the same AC voltage source with a phase voltage regulator (SVR), as shown in FIG. 16. The phase voltage regulator is installed for regulating the output voltage to one of the first and second finger electrodes 321/322, e.g., changing a positive output voltage to a negative voltage. The reduction of influence contributes easiness of capacitive touch screen integration on 3D display as "Low electromagnetic coupling/emission noise parallax barrier LCD".

Figure 17:
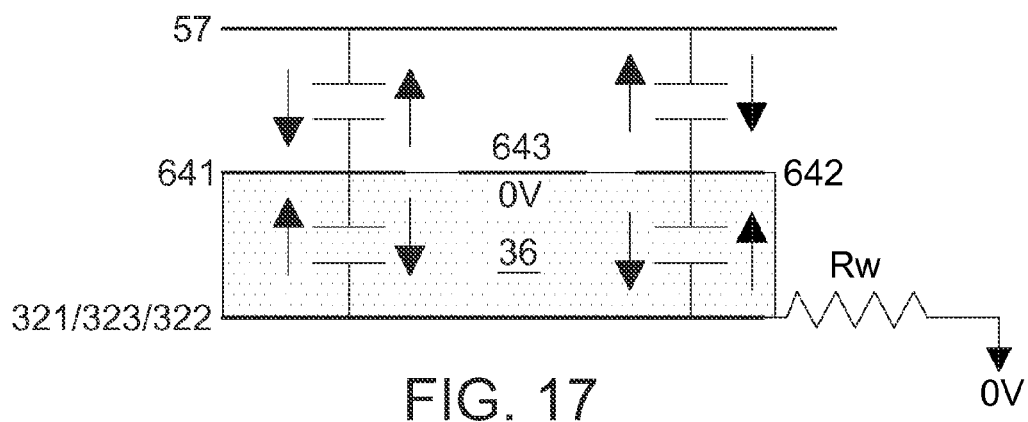
FIG. 17 illustrates a 3D-portrait mode driving scheme of the parallax barrier of FIG. 12 according to the third embodiment of the present disclosure.
Figure 18:
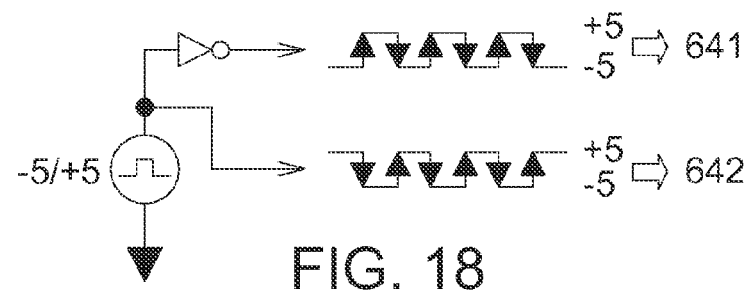
FIG. 18 is a 3D-portrait mode driving circuit diagram of the top electrode layer of the display of FIG. 14B.

FIG. 17 illustrates a 3D-portrait mode driving scheme of the parallax barrier of FIG. 12 according to the third embodiment of the present disclosure. FIG. 18 is a 3D-portrait mode driving circuit diagram of the top electrode layer of the display of FIG. 14B. Please refer to FIG. 17 and FIG. 18. In an embodiment, simultaneous voltage alternations of the third finger electrode 641 and the fourth finger electrode 642 have opposite directions each others and equal absolute value of step voltages (FIG. 18), thus induced charges on the sensing electrode 57 integrated on 3D display could be cancelled, and then influence to the touch screen by the alternation could be reduced. The voltage fluctuation on the sensing electrode 57 would be suppressed even if wiring resistance Rw of the bottom electrode layer 32 (321/323/322) to GND is not low enough. Also, voltage alternation between the third finger electrode 641 and the fourth finger electrode 642 could be optionally implemented by coupling to the same AC voltage source with a phase voltage regulator (SVR), as shown in FIG. 18. The phase voltage regulator is installed for regulating the output voltage to one of the third and fourth finger electrodes 641/642, e.g., changing a positive output voltage to a negative voltage. The reduction of influence contributes easiness of capacitive touch screen integration on 3D display as "Low electromagnetic coupling/emission noise parallax barrier LCD".

Figure 19:
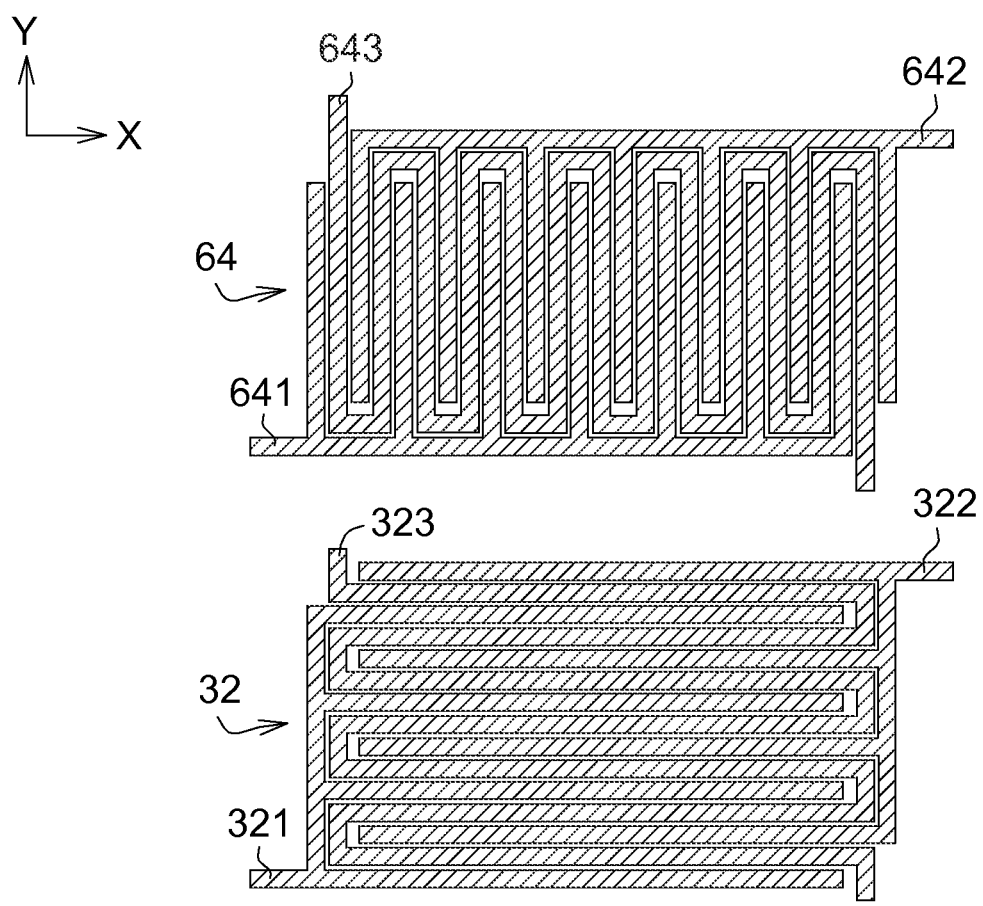
FIG. 19 illustrates a top electrode layer and a bottom electrode layer of another parallax barrier of a 2D/3D switchable display according to the third embodiment of the present disclosure.

FIG. 12 illustrates a top electrode layer and a bottom electrode layer of another parallax barrier of a 2D/3D switchable display according to the third embodiment of the present disclosure. The difference between the parallax barriers of FIG. 12 and FIG. 19 is an upside-down switch of electrode arrangement. In FIG. 19, the first finger electrode 321 and the second finger electrode 322 form a plurality of bottom slits with a bottom elongating direction substantially parallel to X-axis, while the third finger electrode 641 and the fourth finger electrode 642 form a plurality of top slits with a top elongating direction parallel to Y-axis.

In the parallax barrier of FIG. 19, if user would like to proceed the 3D-landscape mode, the third finger electrode 641 and the fourth finger electrode 642 of the top electrode layer 64 could be simultaneously applied with +A+B voltage (such as +5V) and −A+B voltage (such as −5V), while the top middle electrode 643 (optionally disposed) could be applied with B voltage (such as 0V) and the bottom electrode 32 (including the first finger electrode 321, the second finger electrode 322 and the bottom middle electrode 323) could be applied with B Voltage (such as 0V) to reveal the top slits. The alternating voltages are applied on the third finger electrode 641 and the fourth finger electrode 642 at the next time interval. Voltage alternation regularly goes on. If user would like to proceed the 3D-portrait mode, the first finger electrode 321 and the second finger electrode 322 could be simultaneously applied with +A+B voltage (such as +5V) and −A+B voltage (such as −5V), while the bottom middle electrode 323 (optionally disposed) could be applied with B voltage (such as 0V) and the top electrode layer 64 (including the third finger electrode 641, the top middle electrode 643 and the fourth finger electrode 642) could be applied with B Voltage (such as 0V) to reveal the bottom slits. The alternating voltages are applied on the first finger electrode 321 and the second finger electrode 322 at the next time interval. Voltage alternation regularly goes on. Other details, such as 2D-mode and 3D-mode driving voltage applications, are similar to the illustration above, and not described redundantly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A three-dimensional (3D) display comprising:
a display module;
a backlight module, disposed beneath the display module;
a barrier module, disposed above the display module, and comprising:
a bottom substrate having a bottom electrode layer;
an upper substrate having an upper electrode layer, and at least one of the bottom electrode layer and the upper electrode layer comprising at least two finger electrodes interlaced to each other, and voltages with opposite direction being applied on the two finger electrodes at the same time interval in a 3D driving mode; and
a liquid crystal layer disposed between the bottom substrate and the upper substrate;
wherein the bottom electrode layer comprises a first finger electrode, and a second finger electrode is interlaced with the first finger electrode,
wherein the upper electrode layer comprises a third finger electrode, and a fourth finger electrode is interlaced with the third finger electrode,
wherein the first finger electrode of the bottom electrode layer is substantially aligned with the third finger electrode of the upper electrode layer, while the second finger electrode of the bottom electrode layer is substantially aligned with the fourth finger electrode of the upper electrode layer, wherein when the 3D display is in a 3D driving mode, the first finger electrode and the fourth finger electrode are applied with +A+B voltage, and the second finger electrode and the third finger electrode are simultaneously applied with B voltage at a first time interval; while the first finger electrode and the fourth finger electrode are applied with B voltage, and the second finger electrode and the third finger electrode are simultaneously applied with +A+B voltage, at a second time interval.

2. The 3D display according to claim 1, wherein the bottom electrode layer further comprises a bottom middle electrode disposed between the first finger electrode and the second finger electrode, and the upper electrode layer further comprises a top middle electrode disposed between the third finger electrode and the fourth finger electrode.

3. The 3D display according to claim 2, wherein the bottom middle electrode and the top middle electrode are applied with B voltage in the 3D driving mode.

4. The 3D display according to claim 2, wherein the top middle electrode is substantially aligned with the bottom middle electrode.

5. The 3D display according to claim 1, wherein the bottom electrode layer and the upper electrode layer are applied with B voltage in a 2D mode driving scheme.

6. The 3D display according to claim 1, further comprising a sensor electrode disposed on the barrier module.

7. The 3D display according to claim 1, wherein the first finger electrode is coupled to a first voltage source and the second finger electrode is coupled to a second voltage source.

* * * * *